C. JOHNSON.
CALF WEANER.
APPLICATION FILED NOV. 25, 1911.

1,033,903.

Patented July 30, 1912.

Inventor
Charles Johnson.

Witnesses
Chas. L. Griesbauer
G. B. Norton.

By Watson E. Coleman.
Attorney

UNITED STATES PATENT OFFICE.

CHARLES JOHNSON, OF SUNBURY, IOWA.

CALF-WEANER.

1,033,903.  Specification of Letters Patent.  Patented July 30, 1912.

Application filed November 25, 1911. Serial No. 662,362.

*To all whom it may concern:*

Be it known that I, CHARLES JOHNSON, a citizen of the United States, residing at Sunbury, in the county of Cedar and State of Iowa, have invented certain new and useful Improvements in Calf-Weaners, of which the following is a specification, reference being had to the accompanying drawings.

This invention relates to new and useful improvements in weaning devices and more particularly to a calf-weaner and my object is to provide a device of this character which may be readily and quickly applied to the septum of the nose of the animal to effectively carry out the purpose for which the same is designed.

A further object of the invention resides in providing a device of this character which is provided with a flexible metallic shield and which is adapted to readily fall in place over the mouth of the animal when the head of the same is raised, and another object of the invention is to provide prongs or the like which are adapted to be engaged with the animal upon committing the act for which this device is designed to prevent.

A still further object of the invention resides in providing a device which is simple and durable in construction, inexpensive to manufacture and one which is very efficient and useful in operation.

With these and other objects in view, my invention consists in the novel features of construction, combination and arrangement of parts as will be hereinafter referred to and more particularly pointed out in the specification and claims.

Figure 1:
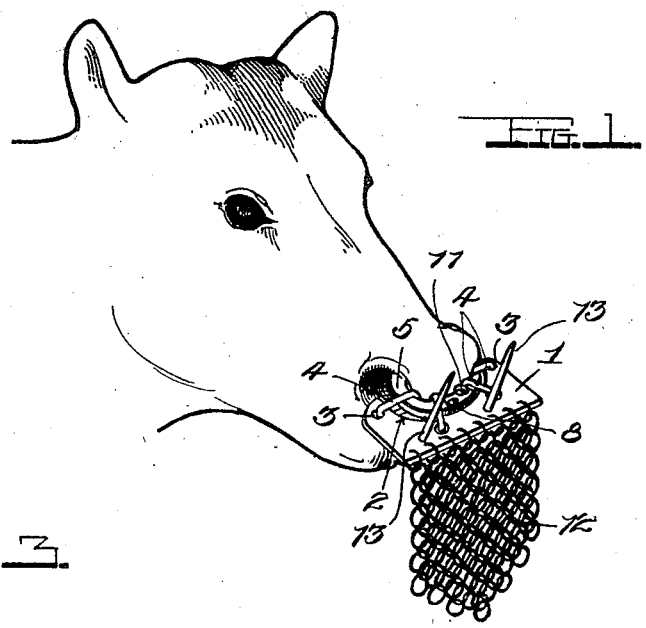
Figure 3:
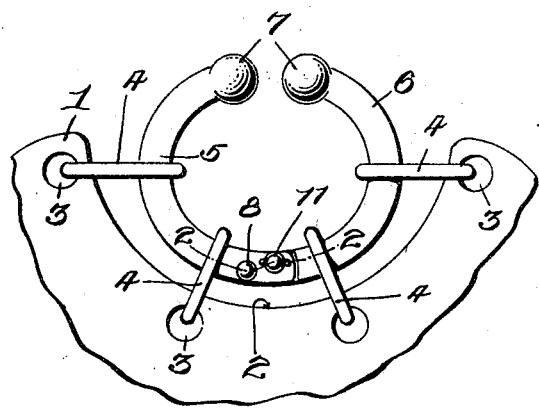
Figure 2:
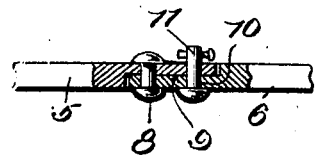

In the accompanying drawing forming a part of this application, Figure 1 is a perspective view of the device showing the manner of application of the same for use, Fig. 2 is a sectional view showing the connection between the two arms or jaw members, and, Fig. 3 is a fragmentary top plan view of the device.

In carrying out my invention, I shall refer to the drawing in which similar reference characters designate corresponding parts throughout the several views and in which 1 indicates a metallic plate having an arcuately designed cavity or recess 2 formed in one edge thereof and a plurality of openings 3 are arranged in said plate spaced from one another immediately adjacent the cavity or recess, each of said openings having engaged therewith a ring or the like 4 which projects within the recess or cavity 2 formed in the plate. A pair of arcuately designed arms 5 and 6 having the head portion 7 formed at one of the ends thereof, are engaged by the ring members 4 and have their inner ends pivotally engaged with one another as shown at the point 8. The inner ends of said arms 5 and 6 which are pivoted to one another have the opposite faces thereof cut away as shown at 9 so that the faces of one of said arms will fit flush with the faces of the other and each of said arms is provided at its cut-away portion with an opening 10, the opening of one being adapted to register with the opening of the other when said arms are brought into one position and in order to retain the arms in this latter position, a pin or bolt 11 is provided which is adapted to be inserted through the alining or registering openings 10. From this construction, it will be seen that the two arms 5 and 6 form substantially a pair of jaw members, the same being pivoted one to the other at their inner ends, and the same are adapted to be engaged with the septum of the nose of the animal, preferably a calf, whereby said arms will be held in their effective positions by the insertion of the pin 11 through the openings. When properly applied, the arms 5 and 6 of the device will enter the nostrils of the animal and the plate 1 will rest on the outer surface of the nose and a flexible shield or the like 12 formed of a plurality of circular metallic links is engaged with the lower edge of said plate 1 so as to be disposed over the mouth of the animal as the head of the same is disposed upwardly. The shield 12 which, as stated above, is formed of numerous circular links, is substantially the same width as the plate 1 and may be of any desired length, whatsoever, and secured on the one face of the plate 1 is a pair of prongs or the like 13 which are adapted to engage all objects or other animals to which the animal wearing the device may approach, said prongs being disposed outwardly. The device, however, may be so applied to the animal as to dispose the prongs 13 inwardly, and thus, the same will engage the nose of the animal wearing the same, when coming in contact with another animal or object, but the application of this device so as to dispose these prongs one way or the other, is entirely optional, it being preferable, however, as shown.

From the foregoing, it will be seen that I have provided a simple, inexpensive, and efficient means for carrying out the objects of the invention, and while I have particularly described the elements which are most well adapted to perform the functions set forth, it is obvious that various changes in the form, proportion and the minor details of construction may be resorted to without departing from the spirit or sacrificing any of the principles of the invention.

Having thus described the invention, what I claim is:

1. A device of the class described, comprising a body member having a cavity in one side thereof, a pair of arcuate clamping arms pivoted to one another and disposed in the cavity, links carried by the body member and engaging said arms to loosely secure the same to said body member, means to lock said arms in their effective positions, and a flexible shield carried on the body member.

2. A device of the class described comprising a body member having one side edge thereof cut away to form a substantial cavity therein, said member being also provided with a plurality of openings at points adjacent the wall of said cavity, a plurality of links engaged with the aforesaid openings of said body member and disposed in the substantial cavity, a pair of arcuate clamping arms pivoted one to the other and also loosely engaged with the portions of said links disposed within the cavity, means to lock said arms in their effective positions, a flexible shield carried on the side edge of the body opposite that having the cavity therein, and prongs projecting from the upper face of said body member.

In testimony whereof I hereunto affix my signature in the presence of two witnesses.

CHARLES JOHNSON.

Witnesses:
PEARLE L. MAURER,
C. H. BUDELIER.

Copies of this patent may be obtained for five cents each, by addressing the "Commissioner of Patents, Washington, D. C."